Patented Sept. 6, 1932

1,875,348

UNITED STATES PATENT OFFICE

CLAUDE G. MINER, OF BERKELEY, CALIFORNIA

PROCESS OF PRODUCING ANHYDROUS ALUMINUM CHLORIDE AND NITROGEN COMPOUNDS

No Drawing. Application filed January 2, 1929. Serial No. 329,952.

This invention relates to a method for the commercial production of anhydrous aluminum halides and nitrogen compound by-products, and is more particularly directed to a process for the commercial production of anhydrous aluminum chloride and certain nitrogen by-products.

The catalytic properties of aluminum chloride for cracking oil are generally known. The use of this catalytic agent, however, has been very limited, due to the difficulty of the present processes in producing the anhydrous aluminum chloride or in producing it at a price where it can compete with other known petroleum oil cracking methods, such as by the use of pressure. In my process, as described in United States Patent No. 1,688,504, it is essential to produce aluminum nitride first and thereafter react upon said nitride with dry hydrochloric acid gas in the presence of a carbonaceous material at an elevated temperature. The production of aluminum nitride, however, is attended by technical and mechanical difficulties as evidenced by the numerous attempts to produce the said aluminum nitride.

I have discovered that anhydrous aluminum chloride and a nitrogen compound can be produced in one operation and under conditions that eliminate the heretofore described difficulties.

I have also discovered that this operation can be carried out at a lower temperature than that at which aluminum nitride can be produced from aluminous materials and this one feature eliminates one of the great difficulties encountered in the process of United States Patent No. 1,688,504, in which it was necessary to produce the aluminum nitride first at a temperature of 1800 to 2000° cen. The aluminous material however, at this temperature easily fuses and this not only stops nitrification but destroys the furnace lining together with other mechanical difficulties.

By the present process, anhydrous aluminum chloride and a nitrogen compound can be produced by one operation at a temperature of 1400 to 2000° C., preferably at a temperature of 1500 to 1800° C., for example at approximately 1650° C., although I do not limit myself to these temperatures. At the said temperature of 1500 to 1800° C., the bauxite, alunite residue, or alumina used in the process will not fuse and this eliminates one of the major technical troubles encountered in the previous processes.

This process treats an aluminous material, as bauxite, alunite residue, etc., with dry hydrochloric acid gas and a nitrogen bearing gas, preferably essentially pure nitrogen, in the presence of a carbonaceous material at an elevated temperature, said ingredients being in correct proportion. As a carbonaceous material, I prefer the coke or tar residue containing aluminum chloride from a refinery still. Preferably, in cracking oil with aluminum chloride, I prefer to run the tar residue to a coky material and then use said coky material with the aluminum chloride contents, as the carbonaceous material. The aluminum chloride contents of the carbonaceous material volatilize out and are added to the aluminum chloride formed from the aluminous material. I find that this coky residue and certain grades of carbon, as willow charcoal and activated carbon, facilitate the reaction, which can be represented as follows:

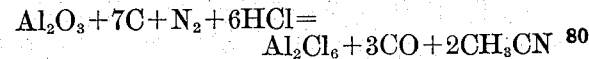

$$Al_2O_3 + 7C + N_2 + 6HCl = Al_2Cl_6 + 3CO + 2CH_3CN$$

With a different proportion of carbon, the reaction can be represented as follows:

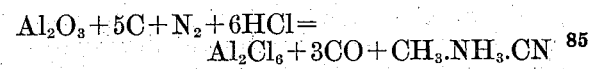

$$Al_2O_3 + 5C + N_2 + 6HCl = Al_2Cl_6 + 3CO + CH_3.NH_3.CN$$

As carbon monoxide is present, it is possible that it will react with the nitrogen compound to give formates, formamides, etc., under proper conditions.

From the foregoing chemical equations it will be observed that with different proportions of carbon, different organic compounds will be formed, that is to say, 7 gram atoms of carbon to one mol of $Al_2O_3$ produces an organic compound which is different from the organic compound produced when 5 gram atoms of carbon are used with one mol of $Al_2O_3$. All carbon in excess of the 3 gram atoms necessary to combine with the three atoms of oxygen of each molecule of $Al_2O_3$ will be available for producing organic compounds.

While the theoretical ratio of the nitrogen to the dry hydrochloric acid gas by volume is as one is to six, it is preferable and found to give better results to have the nitrogen in a greater ratio than this. The better results are a higher yield of the nitrogen compounds. In actual practice it is probable that a mixture of nitrogen compounds will result. It is believed that a ratio of nitrogen to hydrochloric acid gas of one to three will be found suitable, although I do not limit myself to this ratio.

Essentially, therefore, this process consists in the reaction upon an aluminous material with dry hydrochloric acid gas and nitrogen in proper proportion in the presence of the correct ratio of a carbonaceous material at an elevated temperature, preferably 1500 to 1800° centigrade or thereabouts. Any of the halide acids, as hydrobromic, hydrofluoric, etc., can be substituted for the hydrochloric acid gas and obtain the corresponding aluminum halide.

I practice, I would take the aluminous material, as bauxite or alunite residue, and mix it with aluminum chloride coke residue from the refinery still. The ratio of the carbon contents of said coke residue to the alumina is preferably from 70 to 100 parts carbon contents to 100 parts of alumina, although I do not limit myself to these ratios. This mixture is then made into briquets, preferably in the form of a sphere about one inch in diameter. The aluminum chloride still residue itself forms the binder for the briquets. The materials are ground or pulverized to about 15 to 20 mesh, thoroughly mixed, and then subjected to a pressure of one-half a ton to one ton per square inch in a briquet machine for forming the spherical briquets. These briquets are then placed in an electric shaft furnace of considerable height, the heating zone of which extends essentially throughout the entire length. This heating zone is then maintained at 1500 to 1800° centigrade or thereabouts. Ordinary practice would be to pass the mixture of dry hydrochloric acid gas and dry nitrogen in at the bottom of the furnace so that they would pass up through the said briquets and react with the same. I prefer, however, to force the said acid gas and nitrogen in at the top of the furnace so that said gases will pass downward through the briquets. My reason for this is the elimination of the iron chloride from the resultant aluminum chloride. By properly proportioning the velocity of the hydrochloric acid gas and nitrogen, said gases will be used up before they pass the entire length of the electric furnace. After the said gases are consumed in the reaction, we have an atmosphere of aluminum chloride, carbon monoxide, and a nitrogen compound, together with iron chloride as an impurity. However at these temperatures, iron chloride reacts with a mixture of aluminous material and carbon to form aluminum chloride and iron. In this way, by passing the gases in at the top of the furnace, the iron chloride is eliminated, the resultant iron along with the silicon, which is not acted upon by the said acid gas, percolating down into the bottom of the furnace as impurities which, from time to time, are removed by simply tapping out in the molten state. It is also possible to eliminate the iron by passing the acid gas and nitrogen in at the bottom of the furnace, and this can be accomplished by proper design of the shaft furnace with a separate receptacle near the top of said furnace to catch the iron before it percolates back into the atmosphere of acid and nitrogen.

Another advantage of this process is the fact that the nitrogen compounds do not form complex compounds with the aluminum chloride which permits of their separate condensation. The aluminum chloride is preferably condensed with a Cottrell precipitator. I prefer to use two or more condensing towers so constructed that one can be shut off from the furnace while the aluminum chloride is condensing in the other. The said condensing towers are preferably so constricted that they can be heated electrically to 200 to 250° centigrade under a pressure of 30 to 40 pounds. Hence in removing the aluminum chloride, one of the towers can be shut off from the furnace and other exits and heated to 200 to 250° centigrade whereupon the condensed aluminum chloride will melt and run down to the bottom of said tower where it can be tapped off into suitable containers. This permits of an easy and simple way of removing the chloride and handling the same. During the condensation of the aluminum chloride the condensing towers are maintained below 180° C., and best results seem attainable by keeping them below 150° C. One of the nitrogen compounds formed (acetonitrile) is a liquid and the chloride could be washed out of the tower with such and kept in that condition until ready for use, when it can be recovered by simple evaporation of the acetonitrile.

The nitrogen compound can be treated in various ways. For illustration, the acetonitrile can be passed in a caustic soda solution which will give methanol and sodium cyanide both of which are recovered therefrom as such by well known methods, as evaporation under high vacuum. This is one of the ways in which it is preferred to collect and utilize the said nitrogen compounds. Another method is to bring the nitrogen compound directly in contact with steam at an elevated temperature in the presence of hot brick work or other catalyst to obtain methanol and ammonia. Hence the aluminum chloride is condensed out first and the nitrogen compound thereupon passes on, by reason of its lower boiling point and not forming a complex compound with the chloride, and can then be collected in alkali metal hydroxide solution or brought in contact with steam, etc., and the resultant products collected and utilized by well known methods. In certain cases, the nitrogen compound, as acetonitrile, can be condensed out as such and then either placed on the market as such or subsequently treated to obtain the desired products.

Another advantage of this process is the possibility of utilizing aluminous silicates as the source of alumina, although this is not the preferred aluminous material. As examples of aluminum silicates which may be utilized the following are given: ordinary clay, potash and sodium feldspar, leucite and other similar silicates, such as muscovite, sericite etc. In utilizing the said silicates, sufficient carbonaceous material is added thereto to reduce the silica contents to silicon and sufficient more carbonaceous material in ratio to the alumina as heretofore explained. The silicon is not acted upon but drops or percolates down into the bottom of the furnace as such from which place it can be tapped out at intervals. The reaction temperature is essentially the same as described above.

While the process has been described as utilizing an electric shaft furnace, an electric rotary can also be used. In this, the mixture of aluminous material and carbonaceous material is fed into the upper end of the furnace. Ordinary practice would be to pass the hydrochloric acid gas and nitrogen into the lower end of the furnace and counter current to the tumbling solids, but I prefer to pass said acid gas and nitrogen into the upper end of the furnace so that they pass down the furnace with the solids.

Although I have herein set forth as an illustrative example only one method of producing anhydrous aluminum chloride from an aluminous material by treating with hydrochloric acid gas and nitrogen in the presence of a carbonaceous material at an elevated temperature, it is to be understood that this invention is addressed to the production of aluminum halides generally from aluminous materials, employing an acid gas of the halogen series and nitrogen in the presence of a carbonaceous material at an elevated temperature.

Having fully described my invention, it is to be understood that I do not wish to be limited to the exact details herein set forth which may obviously be varied without departing from the spirit of my invention as set forth in the appended claims.

I claim:
1. The process of manufacturing an aluminum halide which comprises subjecting a mixture containing an oxygen containing aluminous material and a carbonaceous material to an atmosphere containing a hydrogen halide gas and nitrogen at an elevated temperature.

2. The process of manufacturing an aluminum halide which comprises subjecting a mixture comprising an oxygen containing aluminous material and a carbonaceous material to an atmosphere containing a hydrogen halide gas and nitrogen at a temperature of between 1400 and 2000° centigrade.

3. The process of manufacturing aluminum chloride which comprises subjecting a mixture of an oxygen containing aluminous material and a carbonaceous material to an atmosphere containing hydrochloric acid gas and nitrogen at an elevated temperature.

4. The process of manufacturing aluminum chloride which comprises subjecting a mixture of an oxygen containing aluminous material and a carbonaceous material to an atmosphere containing hydrochloric acid gas and nitrogen at a temperature of between 1400 and 2000° centigrade.

5. The process of manufacturing aluminum chloride which comprises subjecting a mixture of an oxygen containing aluminous material and a carbonaceous material to an atmosphere containing hydrochloric acid gas and nitrogen at a temperature of approximately 1650° centigrade.

6. The process of manufacturing aluminum chloride from an oxygen containing aluminous material, a carbonaceous material, hydrochloric acid gas and nitrogen substantially in accordance with the following reaction:

$$Al_2O_3 + 6HCl + N_2 + (X) = 3CO + Al_2Cl_6 +$$
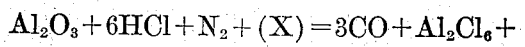

a nitrogen compound wherein X is greater than 3.

7. The process of manufacturing aluminum chloride which comprises contacting at a temperature of approximately 1400 to 2000° C. a mixture containing hydrochloric acid gas and nitrogen with a mixture of an oxygen containing aluminous material and a carbonaceous material in which the ratio of the carbon to the lumina thereof is not less than 3 gram atoms of carbon to one gram molecular weight of alumina.

8. The process of manufacturing aluminum chloride and nitrogen by-products which comprises subjecting a mixture of an oxygen containing aluminous material and a carbonaceous material to an atmosphere containing hydrochloric acid gas and a nitrogen bearing gas at an elevated temperature.

9. The process of manufacturing an aluminum halogen salt which comprises subjecting a mixture of an oxygen containing aluminous material and a carbonaceous material to an atmosphere containing a hydrogen halide and a nitrogen bearing gas at an elevated temperature.

10. The process of manufacturing aluminum chloride which comprises subjecting a mixture of aluminum chloride refinery coke residue and alumina, in which the ratio of the carbon of the coke residue to the alumina is in excess of approximately 36 to 102 to an atmosphere containing hydrochloric acid gas and nitrogen in the approximate ratio of 6 to one by volume, at a temperature of approximately 1650° centigrade.

11. The process of manufacturing aluminum chloride which comprises passing a mixture of hydrochloric acid gas and nitrogen over a mixture containing an oxygen containing aluminous material and a carbonaceous material at 1400 to 2000° centigrade and condensing the aluminum chloride.

12. The process of manufacturing aluminum chloride which comprises passing a mixture containing hydrochloric acid gas and nitrogen over a mixture of an oxygen containing aluminous material and a carbonaceous material at an elevated temperature and condensing the aluminum chloride.

13. The process of manufacturing aluminum chloride and nitrogen by-products which comprises contacting a mixture containing hydrochloric acid gas and nitrogen with a mixture of alumina and refinery coke residue at an elevated temperature, and condensing out the aluminum chloride and converting the nitrogen by-products in ammonia and methanol.

14. The process of manufacturing aluminum chloride and nitrogen by-products which comprises contacting a mixture containing hydrochloric acid gas and nitrogen with a mixture of an oxygen containing aluminous material and aluminum chloride refinery coke residue at an elevated temperature, and condensing the aluminum chloride.

15. The process of manufacturing aluminum chloride which comprises subjecting a mixture of aluminum oxide and a carbonaceous material to an atmosphere containing a mixture of hydrochloric acid gas and nitrogen at an elevated temperature.

16. The process of manufacturing aluminum chloride which comprises subjecting a mixture of alunite residue and a carbonaceous material to an atmosphere containing a mixture of hydrochloric acid gas and nitrogen at an elevated temperature.

17. The process of producing an aluminum halide and a nitrogen containing organic compound which comprises reacting at an elevated temperature upon an oxygen containing aluminum compound with a hydrogen halide in the presence of nitrogen and carbon, the said carbon being present in sufficient proportion as to liberate aluminum in the said aluminum compound for the formation of aluminum halide and also to provide sufficient carbon for the formation of the nitrogen containing organic compound.

18. The process of producing aluminum chloride and a nitrogen containing organic compound which comprises reacting at an elevated temperature upon an oxygen containing aluminum compound with hydrochloric acid in the presence of nitrogen and carbon, the said carbon being present in sufficient proportion as to liberate aluminum in the said aluminous compound for the formation of aluminum chloride and also to provide sufficient carbon for the formation of the nitrogen containing organic compound.

In testimony whereof I affix my signature.

C. G. MINER.